Oct. 1, 1963   I. ATKINS ETAL   3,105,620
FLOW CONTROLLER

Filed Dec. 14, 1960   2 Sheets-Sheet 1

INVENTORS
EDWARD H. ELLMS
IRVING ATKINS
BY
Joseph G. Ryan
ATTORNEY

Oct. 1, 1963
I. ATKINS ETAL
3,105,620
FLOW CONTROLLER
Filed Dec. 14, 1960
2 Sheets-Sheet 2
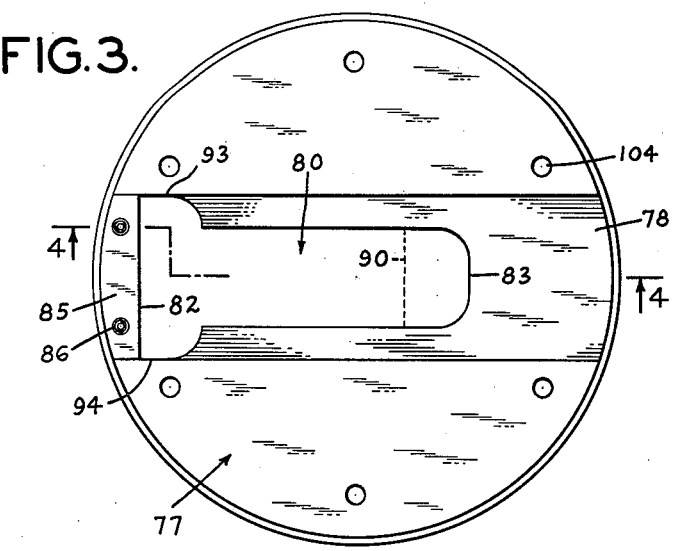
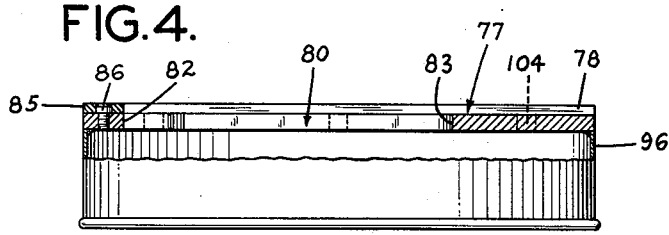
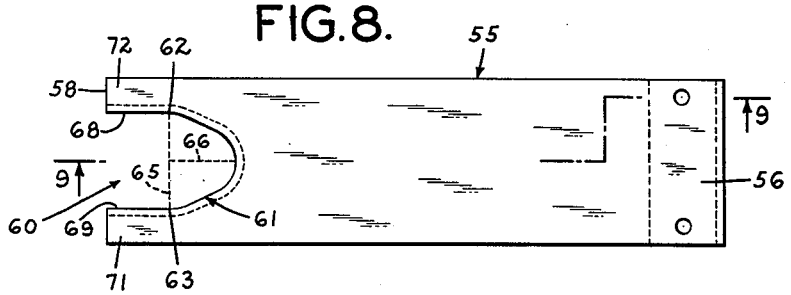
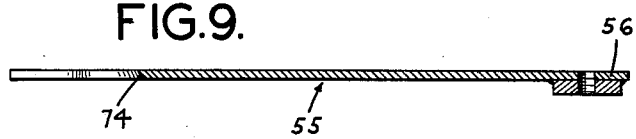
INVENTORS:
EDWARD H. ELLMS
IRVING ATKINS
BY
*Joseph G. Ryan*
ATTORNEY

United States Patent Office 3,105,620
Patented Oct. 1, 1963

3,105,620
FLOW CONTROLLER
Irving Atkins, Levittown, and Edward H. Ellms, Bogota, N.J., assignors to Allied Chemical Corporation, New York, N.Y., a corporation of New York
Filed Dec. 14, 1960, Ser. No. 75,838
10 Claims. (Cl. 222—342)

This invention relates to variable orifice valves. More particularly, the invention is directed to improvements in flow controllers for regulating discharge, from containers or other source of supply, of pulverulent powdery solids or other materials of similar fluid or semi-fluid flow characteristics.

An object of the invention is to provide variable orifice valves especially adaptable for handling fine, low bulk density powders notably those which, in industrial use, are aerated so as to approach a nearly fluid state, but when insufficiently or non-uniformly aerated tend to "bridge" over apertures or orifices several inches in diameter. A further object of the invention is to afford valve structures which can be disassembled readily for complete cleaning from the outside of the container, conduit or other source of supply with which the valve may be associated. This feature is of major importance in large scale operations where the material being handled is changed from time to time, or where total integrity of chemical or color purity must be maintained, or where frequent valve cleaning is necessary because the material is unstable, or sensitive to oxidation or bacterial action.

The invention, and the objects and advantages thereof may be understood from consideration of the following description taken in connection with the accompanying drawings, in which FIG. 1 is a plan view of a material flow controller, FIG. 1 being taken looking downwardly in the interior of a material container to a bottom discharge aperture of which one embodiment of the variable orifice valve structure of the invention is operatively attached;

FIG. 3 is a plan view of a valve gate housing;

FIG. 4 is a vertical section taken on the line 4—4 of FIG. 3;

FIG. 8 is a plan view of a valve gate, and

FIG. 9 is a vertical section taken on the line 9—9 of FIG. 8.

Figure 1:
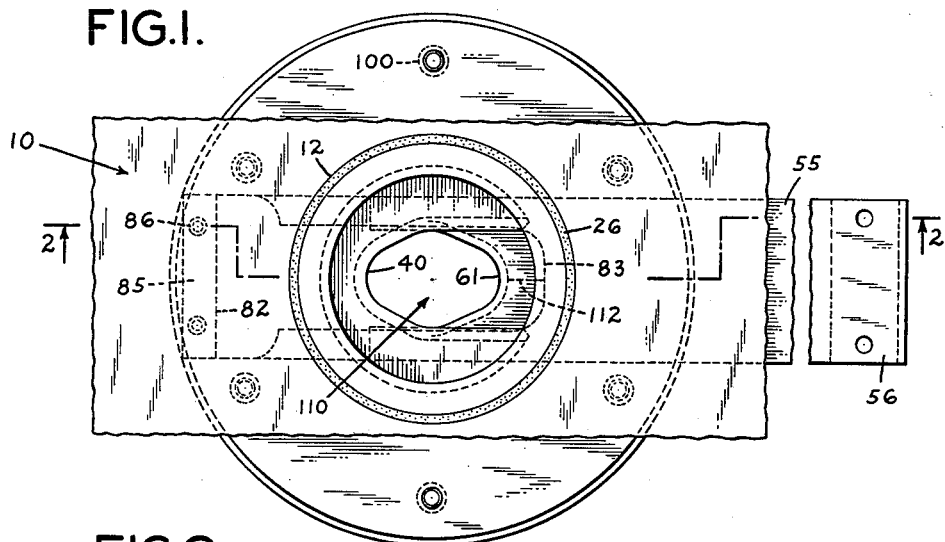
Figure 2:
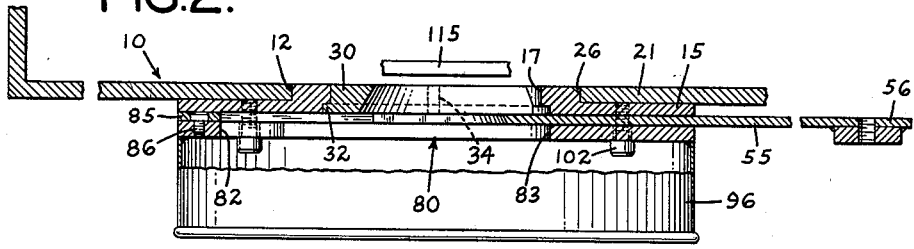
FIG. 2 is a vertical section taken on the line 2—2 of FIG. 1.
Figure 5:
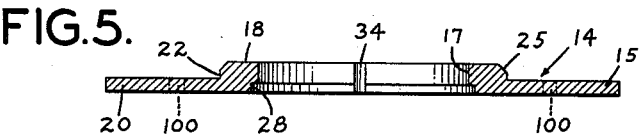
FIG. 5 is a vertical section of a seat for an orifice plate.

In FIG. 2, 10 indicates, in fragmental vertical section, the bottom wall of a container having a circular discharge aperture 12, the inside of the container bottom wall and also the circumference of the aperture 12 being shown in the plan of FIG. 1. FIG. 5 illustrates in vertical section a seat 14 for an orifice plate. Seat 14 comprises a circular steel disc 15 having a centered circular opening 17, and an annular raised face 18. The vertical height of the raised face, above the upper surface of the outer annular flange section 20 preferably equals the thickness of the bottom wall 21 of the container. The outside circumference of the short, vertically upstanding rim 22 of the raised face 18 is such as to afford a close fit within the periphery of the circular aperture 12 in the container wall. Thus, when the raised face of seat 14 is tightly set within the circumference of container discharge orifice 12, as will be seen from FIG. 2, the upper surface of the raised face of the orifice plate seat is flush with the adjacent inner surface of the container wall.

The section of FIG. 2 shows the orifice plate seat 14 in operative position within the container aperture 12, and the upper surface of the annular flange section 20 in tight engagement with the adjacent surface of the underside of the container bottom wall 21. The raised face of seat 14 may be fixedly associated with the contiguous circumference of the container discharge aperture 12 in any suitable manner. However, as indicated in FIG. 5, it is preferred to bevel the upper periphery of the raised face as at 25 so as to provide an annular groove between the periphery of the aperture 12 and the upper circumference of face 18. The groove facilitates welding, as at 26, which may be ground down so as to maintain a flush relationship between the upper surface of seat 14 and the inner surface of the container bottom. The circular opening 17 of seat 14 is counterbored at the lower end, as at 28, dimensionally sufficient to receive a retaining lip of an orifice plate detachably insertable in the circular opening 17 of seat 14.

Figures 6, 7:
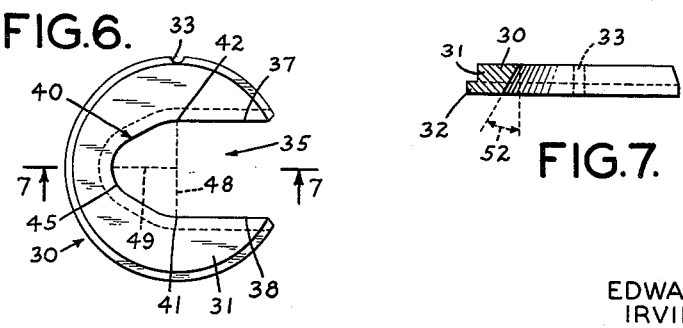
FIG. 6 is a plan view of an orifice plate.
FIG. 7 is a vertical section taken on the line 7—7 of FIG. 6.

FIGS. 6 and 7 illustrate an orifice plate 30 which, prior to cutting to provide an orifice forming cut-out, is a planar disc. Vertical thickness of the disc equals the vertical thickness of the seat flange 20, FIG. 5, plus the vertical thickness of the raised face 18. Plate 30 is formed at its lower circumferential edge with an outwardly projecting annular retaining lip 32. The diametric dimensions of the upper disc section 31 and of the retaining lip 32 of plate 30 are such that the plate may be inserted, from the outside of the container, in the circular opening 17 of the plate seat. Registration of retaining lip 32 in the counterbore 28 of the seat limits upward movement of the orifice plate so that the upper surface of the plate remains flush with the upper surface of raised seat face 18, and with the bottom inner surface of the container. Further, when plate 30 is seated, the under surface of the plate is flush with the under surface of the flange 20 of seat 14. Fit of the orifice plate in seat opening 17 is chosen so that the plate may be readily inserted and removed but yet tight enough to retain fine powder. The plate 30 and the seat 14 are provided with registering half-slots 33 and 34 which, in conjunction with a suitable pin, serve to align the plate in the seat and to prevent any rotation of the plate thereafter.

Orifice plate 30, FIGS. 6 and 7, is formed with an orifice cut-out 35 the edges of which constitute part of the perimeter of a variable orifice. The orifice cut-out is generally U-shaped. The line of delineation of the cut-out comprises straight-line U legs 37 and 38 the free ends of which intersect the periphery of the plate. The delineation line also includes a curved section 40 the ends of which merge at 41 and 42 with the inner ends of the straight-line U legs. While curved line section 40 may be a single smooth arcuate curve of a single given radius, preferably curved section 40 comprises a plurality of different radii curves tangentially connected. It has been found that most effective results are obtained by use of a curved section 40 in which arc radii at 41 and 42 are equal to each other but are greater than the radius of the arc as at 45, the apex of the cut-out. For convenient reference purposes, it may be considered that the cut-out 35 has an overall longitudinal axis which coincides with the section line 7—7 of FIG. 6. It will be noted that the curved section 40 of the cut-out line from one end at 41 to the other end at 42 defines a hemiellipse-like area having a minor axis represented by the dotted line 48 and a hemimajor axis represented by the dotted line 49. The latter axis coincides with the longitudinal axis of the cut-out 35 as a whole. While the longitudinal axis of cut-out 35 need not necessarily coincide with a diameter of the initial circular orifice plate disc prior to making of the cut-out, in the preferred form shown, all three axes mentioned coincide with disc diameters. As shown particularly in FIG. 7, plate 30, along the cut-out line, is undercut, as at 52, e.g. 30 degrees to provide a sharp orifice edge which minimizes "bridging" and cohesion of material to the orific perimeter.

The valve gate 55, FIGS. 8 and 9, is an elongated rectangular flat plate of length sufficiently greater than the maximum diameter of the valve unit to facilitate attachment, at the outer end 56, of conventional means, not shown, for manually or automatically controlling or regulating the reciprocable operation of the valve gate. The leading edge 58 of the gate is provided with an orifice cut-out 60 similar to, but when in operation reversely disposed with regard to cut-out 35 of orifice plate 30 of FIG. 6. The curved cut-out line 61, FIG. 8, between points 62 and 63, duplicates curved line section 40 of the plate of FIG. 6. Hence, curved cut-out line 61, FIG. 8, defines a hemiellipse-like area having a minor axis represented by the dotted line 65, and a hemimajor axis denoted by dotted line 66, which area and axes duplicate the corresponding components of the orifice plate. The cut-out line of the cut-out 60, FIG. 8, includes straight line portions 68 and 69, terminating at their free ends in the leading edge 58 of the gate. Straight line portions 68 and 69 provide on the leading end of the gate symmetrical prongs 71 and 72 which are preferably of a longitudinal length not less than the length of the hemimajor axis 66. Thus, cut-out 60 in the gate, including the e.g. 30 degrees undercut 74, reversely duplicates cut-out 35 of FIG. 6, except that the straight line portions 68 and 69 of the gate are a little shorter than the straight line sections 37 and 38 of the orifice plate. The hemimajor axis 66 of the gate, the longitudinal axis of cut-out 60 as a whole, and the longitudinal axis of the gate 55 as a whole all coincide.

The circular plate or disc 77, FIGS. 3 and 4, affords a housing for mounting the gate and operating the same from outside the container wall. An elongated slot or channel 78 is cut in the upper surface of disc 77 from periphery to periphery. Width and depth of the slot are substantially the same as the width and thickness of the gate 55, finished tolerances being such as to facilitate free reciprocation of the gate within the slot, the upper flat surface of the gate being substantially flush with the upper horizontal surface of disc 77. The longitudinal axis of slot 78 coincides with a diameter of disc 77 in the preferred embodiment shown.

An irregularly outlined, roughly T-shaped internal opening 80 is cut in the bottom of slot 78 of disc 77. The long axis of cut-out 80 preferably coincides with the longitudinal axis of the slot. Positioning of cut-out 80 in slot 78 is apparent from FIGS. 3 and 4. Lengthwise, the wide end of cut-out 80 terminates at 82, and at the narrow end at 83. Outward from the widest part of the irregular opening, the slot is closed by a removable stop 85 held in position by pins 86. The transverse dimension of the narrow portion of cut-out 80, as represented by the dotted line 90, FIG. 3, is at least equal to and preferably greater than the length of the minor axes 48 and 65 of the orifice cut-outs (FIGS. 6 and 8) plus the 30 degree undercuts, i.e. at every point the opening of cut-out 80 is as large or larger than the underside of the herein variable orifice when open to maximum area. At the wide end, the width dimension of cut-out 80 is the same as the width of the slot as can be seen in FIG. 3 at 93 and 94. Disc 77, FIG. 4, may include a depending skirt 96 which provides a short cylindrical discharge conduit to which may be attached other conduit means for conducting material to the point of use.

For assembly and operation the orifice plate seat 14 of FIG. 5 is fixedly attached in container wall aperture 12, as described and shown particularly in FIG. 2. Although no advantage is afforded, seat 14 may be formed integrally in conjunction with the periphery of container aperture 12. Orifice plate 30 of FIG. 6 is detachably inserted in the circular opening 17 of the orifice plate seat, and radially positioned by means of the slots 33 and 34 and short cooperating pin as described. Flange 20 of the orifice plate seat 14 is suitably tapped as at 100, FIGS. 1 and 5, to receive screws 102, and the disc 77, FIGS. 3 and 4, is correspondingly drilled as at 104 to accommodate the same screws 102 by means of which the valve gate housing may be securely attached, from the outside of the container, the the flange 20 of the orifice plate seat 14. The upper planar, unslotted portion of the surface of housing disc 77 holds the positioning pin and orifice plate 30 within the seat 14. Relative circumferential locations of pin or key half-slot are chosen to position orifice plate 30 radially in its own plane so that the open end of the orifice cut-out 35 faces the open end of slot 78, and so that the longitudinal axis of the orifice plate cut-out is parallel to and lies in the same vertical plane as the longitudinal axis of the valve gate slot, i.e. in the case of a circular valve unit, so that the center of the orifice plate disc and the center of the gate housing disc lie in the same vertical axis.

The valve gate may be inserted in the open end of slot 78 (right end of FIG. 2), slid inwardly until curve end points 42 of FIG. 6 and 62 of FIG. 8 register in vertical alignment, at which time curve points 41 of FIG. 6 and 63 of FIG. 8 likewise vertically register. There is thus formed by the cut-outs in plate 30 and in the gate, now in sliding engagement and lying in contiguous planes, an ellipse-like orifice periphery of which is formed half by the curved cut-out line 40 of FIG. 6 and half by the curved cut-out line 61 of FIG. 8. In the gate position denoted, the variable orifice 110 appears in plan in FIG. 1 at an adjustment which, for purposes of convenient reference, may be considered as normal full open position. With this setting, the outer end of the valve gate may be connected suitably with whatever more or less conventional mechanism is to be employed for effecting maximum reciprocation of the valve gate and corresponding regulation of orifice opening. Each of orifice plate 30 and the leading edge 58 of gate 55 is provided with an orifice cut-out which terminates on the inner end in a hemiellipse-like open area. In the position of the gate shown in FIG. 1, the length of the minor axis of the ellipse-like orifice is the same as the length of the minor axes 48 and 65 of FIGS. 6 and 8, and the length of the major axis in FIG. 1 is equal to the sum of the hemimajor axes 49 and 66 of FIGS. 6 and 8.

The gate is slidable inwardly in the slot more than sufficiently to completely close the orifice 110. It has been found that, with regard to regulating flow of materials of the type described, the preferred forms of orifice boundary delineations afford marked advantages respecting minimization of "bridging" for practically all orifice size adjustments. Experience indicates that improved non-bridging results are dependent upon the relationship of the length of the minor and major axes when the orifice is in the preferred normal full open position as in FIG. 1. The length of the major axis should significantly exceed the length of the minor axis, and we find that most satisfactory results may be obtained when the major axis is of length at least 1.3 times the length of the minor axis, preferred upper limit of major axis length being about 2.6 times the length of the minor axis. As the gate is reciprocated back and forth to provide various working adjustments of the total orifice area, the corresponding shapes of the effective orifice opening, except for a practically-of-no importance interval immediately before complete orifice closing and immediately after initiating orifice opening, are all generally oblong, oval, elliptical, or elliptical-like and present no sharp peripheral angles which function to promote bridging. The major-minor axes length ratios described afford relatively flat-sided orifices (flat sides referring to orifice sides generally parallel to the major axis) having relatively flat smooth side curves merging with end curves in such a way that, throughout the practicable operating range of material discharge, the various orifice peripheries contain no sharp angles. The gate is slidable outwardly from the position shown in FIG. 1 by an amount approximately equal to the length of dotted line 112, FIG. 1. This maximum opening adjustment affords a generally elliptical shaped orifice having straight-line sides of length approximately equal to the length of the dotted line 112.

In use, some fine powder or dust tends to collect on the top surface of the gate slot beyond the ends of the valve gate prongs. To eliminate potential gate reciprocation difficulties, the gate prongs 71 and 72, FIG. 8, are made long enough, and the opening 80, at the closed end of the slot is made wide enough so that, in the event of powder accumulation in the slot, sufficient inward movement of the gate pushes powder along the top surface of the slot into the widened area of slot cut-out 80, and thence thru into the discharge conduit 96.

The valve structure of the invention is particularly adaptable for use in connection with a source-of-supply container equipped internally with an agitator having one or more arms, flights, ribbons or blades arranged to sweep, periodically on operation of the agitator, across the upper face of the orifice and in close proximity thereto by means of mechanism not shown. The effective edge of an agitator element is indicated diagrammatically at 115 in FIG. 2. The invention includes the combination comprising the valve structure described, the associated container, and an agitator therein. With particular reference to the type of material handled and to the potential "bridging" both as previously discussed, we find that in order to facilitate maintenance of desired flow particularly with regard to insufficiently or non-uniformly aerated pulverulent powdery solid, apparatus construction, as to relative positioning of the upper face of the orifice and the immediately adjacent effective edge of the agitator, preferably is such that the distance between the upper face of the orifice and the effective adjacent edge of the agitator is less than half the smallest dimension of the smallest practicably useable orifice adjustment of a given valve. For any selected practicable orifice adjustment, such construction causes the effective edge of the agitator to sweep over the upper orifice face at an elevation below the apex of the arch of any "bridge" which might tend to form with respect to such selected orifice adjustment, and thus prevent anything more than momentary "bridging."

Various parts of the valve may be any suitable materials such as stainless steel. Critical fits may be ground and polished to acceptable tolerances as customary in the valve art.

We claim:

1. A flow controller for regulating discharge of material from a container, said controller comprising a variable orifice valve in combination with a material discharge aperture in the container wall, said valve including an orifice plate seat peripherally associated with the periphery of the aperture, an orifice plate detachably insertable in the seat from the outside of the container wall, the seat and the plate being constructed and arranged so that inner surfaces of each are flush with the adjacent inner surface of the container wall, an orifice cut-out in the plate, a valve gate operable from the outside of the container and having an orifice cut-out, and means for mounting the gate, exteriorly of the outside of the container wall, so as to effect, on movement of the gate, cooperative action of the said cut-outs to form a material discharge orifice variable from a closed to an open position.

2. The flow controller of claim 1 in which the means for mounting the gate includes a gate housing formed to maintain said gate and plate in cooperative relation, and means accessible from the outside of the container wall for detachably connecting the housing to the orifice plate seat.

3. A flow controller for regulating discharge of material from a container, said controller comprising a variable orifice valve in combination with a material discharge aperture in the container wall, said valve including an orifice plate seat peripherally associated with the periphery of the aperture, a planar orifice plate detachably insertable in the seat from the outside of the container wall, the seat and the plate being constructed and arranged so that inner surfaces of each are flush with the adjacent inner surface of the container wall, an orifice cut-out in the plate positioned in the plate so that the ends of the cut-out line intersect the periphery of the plate, a planar valve gate having a leading edge, an orifice cut-out in the leading edge and configured substantially the same as the said plate cut-out, and means for mounting said gate, exteriorly of the outside of the container wall, for reciprocable sliding movement over the outer face of said orifice plate, said plate and said gate being relatively positioned with open ends of the cut-outs facing each other in substantially end-wise alignment.

4. A flow controller for regulating discharge of material from a container, said controller comprising a variable orifice valve in combination with a material discharge aperture in the container wall, said valve including an orifice plate seat peripherally associated fixedly with the periphery of the aperture, a planar orifice plate detachably insertable in the seat from the outside of the container wall, the seat and the plate being constructed and arranged so that inner surfaces of each are flush with the adjacent inner surface of the container wall, a generally U-shaped orifice cut-out in the plate, said cut-out having a longitudinal axis and being positioned in the plate so that the free ends of the U legs intersect the periphery of the plate; an elongated planar valve gate having a leading edge, a generally U-shaped orifice cut-out in the leading edge, said gate cut-out having a longitudinal axis and being configured substantially the same as the said plate cut-out; and means for mounting the gate, exteriorly of the outside of the container wall, for recprocable sliding movement over the outer face of the orifice plate, the plate and the gate being relatively positioned in contiguous planes, with open ends of the U-shaped cut-outs facing each other in substantially end-wise alignment, and with the said longitudinal axes parallel.

5. The flow controller of claim 4 in which the means for mounting the gate includes a gate housing having a slot in the upper planar face thereof to reciprocably support the gate in sliding engagement with the outer face of the orifice plate, a cut-out section in the bottom of the slot positioned beneath the orifice and having a peripheral dimension greater than that of the orifice, and means accessible from the outside of the container wall for detachably connecting the housing to the orifice plate seat.

6. The flow controller of claim 4 in which the said orifice plate and gate cut-outs are so delineated that, when the orifice plate and the gate are slidably engaged in operative position and when the open ends of the cut-outs face each other and when the ends of the curved portions of the orifice plate cut-out are in substantial registration with the corresponding ends of the curved portion of the gate cut-out, there is formed a substantially elliptical orifice having a major axis in the range of 1.3–2.6 times the length of the minor axis.

7. A variable orifice valve comprising an orifice plate seat adapted to be peripherally associated with the periphery of a material discharge aperture in a container wall, an orifice plate detchably insertable in the seat from the underside thereof, the seat and the plate being formed and arranged so that when the plate is in the seat opposite outer surfaces of the plate and seat are flush, an orifice-forming cut-out extending inwardly of the perimeter of the plate and terminating in a hemiellipse-like open area, an elongated planar valve gate having an orifice-forming cut-out extending inwardly from the leading edge of the gate and being configured substantially the same as the said plate cut-out, means for mounting the gate, exteriorly of the outside of the container wall, for reciprocable sliding movement across the under face of the orifice plate with the plate and the gate positioned in contiguous planes and with open ends of the cut-outs facing each other in substantial end-wise alignment to thereby form a variable orifice, said mounting means including an opening, adapted to underlie the said variable orifice, and having an area at least as great as the maximum orifice opening.

8. The variable orifice valve of claim 7 in which the means for mounting the gate includes a planar housing slotted on the surface thereof to slidably receive said gate so that the upper surfaces of the housing and gate are copolanar, and means for detachably connecting the housing to the said orifice plate seat.

9. Apparatus for regulating discharge of material from a container comprising in combination a container having a material discharge aperture in the bottom wall thereof, an agitator in the container, and a variable orifice valve in combination with said aperture; said valve including an orifice plate seat peripherally associated with the periphery of the aperture, a planar orifice plate detachably insertable in the seat from the outside of the container wall, the seat and the plate being constructed and arranged so that inner surfaces of each are flush with the adjacent inner surface of the container wall, an orifice cut-out in the plate positioned in the plate so that the ends of the cut-out line intersect the periphery of the plate, a planar valve gate having a leading edge, an orifice cut-out in the leading edge and configured substantially the same as the said plate cut-out, means for mounting said gate, exteriorly of the outside of the container wall, for reciprocable sliding movement over the outer face of said orifice plate, said plate and said gate being relatively positioned with open ends of the cut-outs facing each other in substantially end-wise alignment, to thereby form a variable orifice; said agitator being associated with the inside of the container wall and discharge aperture so that, on operation of the agitator, an effective edge thereof is positioned immediately adjacent to and sweeps across the upper face of the orifice.

10. The apparatus of claim 9 in which relative positioning of the upper face of the orifice and the immediately adjacent effective edge of the agitator is such that the distance between the upper face of the orifice and the effective edge of the agitator is less than half the smallest dimension of an orifice adjustment selected for use.

References Cited in the file of this patent

UNITED STATES PATENTS

| | | |
|---|---|---|
| 590,728 | Moffatt | Sept. 28, 1897 |
| 704,971 | Campbell | July 15, 1902 |
| 1,065,494 | Andersen | June 24, 1913 |
| 1,496,807 | Bullock | June 10, 1924 |
| 1,610,759 | Downing | Dec. 14, 1926 |
| 2,110,252 | Wolcott | Mar. 8, 1936 |
| 2,274,752 | Straub | Mar. 3, 1942 |